(12) United States Patent
Hu et al.

(10) Patent No.: US 11,553,438 B2
(45) Date of Patent: Jan. 10, 2023

(54) ENCODING AND TRANSMIT POWER CONTROL FOR DOWNSIZED UPLINK TRIGGER-BASED PPDU TRANSMISSIONS IN NEXT-GENERATION WLAM SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 17/493,678

(22) Filed: Oct. 4, 2021

(65) Prior Publication Data

US 2022/0116885 A1 Apr. 14, 2022

Related U.S. Application Data

(60) Provisional application No. 63/090,307, filed on Oct. 12, 2020.

(51) Int. Cl.
*H04W 52/24* (2009.01)
*H04L 1/00* (2006.01)
(Continued)

(52) U.S. Cl.
CPC ........... *H04W 52/24* (2013.01); *H04L 1/0003* (2013.01); *H04L 1/0042* (2013.01); *H04L 5/001* (2013.01); *H04W 52/143* (2013.01); *H04W 52/54* (2013.01)

(58) Field of Classification Search
CPC .............. H04W 52/24; H04W 52/143; H04W 52/54; H04L 1/0003; H04L 1/0024; H04L 5/001
(Continued)

(56) References Cited

U.S. PATENT DOCUMENTS 10,091,813 B2 * 10/2018 Wang ................. H04W 74/0833
10,257,833 B2 * 4/2019 Huang .............. H04W 74/0816
(Continued)

FOREIGN PATENT DOCUMENTS

EP 3396925 A2 10/2018
WO WO 2016191494 A1 12/2016
(Continued)

OTHER PUBLICATIONS

European Patent Office, European Search Report for European Patent Application No. 21201438.5, dated Feb. 24, 2022.
(Continued)

*Primary Examiner* — Hai V Nguyen
(74) *Attorney, Agent, or Firm* — Han IP PLLC; Andy M. Han

(57) ABSTRACT

Various schemes pertaining to encoding and transmit power control for downsized trigger-based (TB) physical-layer protocol data unit (PPDU) transmissions in next-generation WLAN systems are described. A station (STA) receives a trigger frame indicating an allocated resource unit (RU) of a first size. The STA performs channel sensing responsive to receiving the trigger frame. In response to detecting at least one subchannel being busy from the channel sensing, the STA performs a downsized trigger-based (TB) transmission with a downsized RU or multi-RU (MRU) of a second size smaller than the first size by utilizing downsized RU or MRU allocation information while maintaining a value of each of one or more parameters unchanged in an encoding process to perform the downsized TB transmission.

20 Claims, 11 Drawing Sheets

(51) Int. Cl.
*H04L 5/00* (2006.01)
*H04W 52/14* (2009.01)
*H04W 52/54* (2009.01)

(58) Field of Classification Search
USPC .................................................. 455/522, 69
See application file for complete search history.

(56) References Cited

U.S. PATENT DOCUMENTS

| | | | |
|---|---|---|---|
| 10,756,851 B2* | 8/2020 | Hedayat | H04W 72/1289 |
| 11,160,084 B2* | 10/2021 | Asterjadhi | H04W 72/048 |
| 11,395,367 B2* | 7/2022 | Kim | H04W 72/121 |
| 2007/0293250 A1* | 12/2007 | Kim | H04H 60/91 |
| | | | 455/466 |
| 2012/0033727 A1* | 2/2012 | Shor | H04N 19/132 |
| | | | 375/E7.126 |
| 2016/0330714 A1* | 11/2016 | Hedayat | H04L 1/1621 |
| 2017/0070961 A1* | 3/2017 | Bharadwaj | H04W 52/242 |
| 2018/0255589 A1 | 9/2018 | Patil et al. | |
| 2018/0302924 A1* | 10/2018 | Kim | H04W 74/085 |
| 2018/0310310 A1* | 10/2018 | Huang | H04W 72/0453 |
| 2019/0109674 A1* | 4/2019 | Hedayat | H04L 1/1621 |
| 2019/0200387 A1 | 6/2019 | Chitrakar et al. | |
| 2019/0281614 A1 | 9/2019 | Chen et al. | |
| 2020/0245359 A1* | 7/2020 | Nezou | H04W 74/0816 |
| 2021/0068197 A1* | 3/2021 | Kim | H04W 84/12 |
| 2021/0176643 A1* | 6/2021 | Jang | H04L 1/0008 |
| 2021/0243756 A1* | 8/2021 | Kim | H04W 72/02 |
| 2021/0409165 A1* | 12/2021 | Wang | H04L 1/1822 |
| 2022/0132351 A1* | 4/2022 | Liu | H04W 24/10 |

FOREIGN PATENT DOCUMENTS

| | | |
|---|---|---|
| WO | WO 2020022814 A1 | 1/2020 |
| WO | WO 2020093890 A1 | 5/2020 |

OTHER PUBLICATIONS

Taiwan Intellectual Property Office, Office Action for Taiwan Patent Application No. 110137097, dated Jan. 4, 2022.

* cited by examiner

| RU/MRU size | $N_{SD,short}$ | |
|---|---|---|
| | MCS ∈ {0, 13} | MCS = 15 |
| 26-tone | 6 | 2 |
| 52-tone | 12 | 6 |
| 52+26-tone | 18 | 8 |
| 106-tone | 24 | 12 |
| 106+26-tone | 30 | 14 |
| 242-tone | 60 | 30 |
| 484-tone | 120 | 60 |
| 484+242-tone | 180 | 90 |
| 996-tone | 240 | 120 |
| 996+484-tone | 360 | 180 |
| 996+484+242-tone | 420 | 210 |
| 2×996-tone | 492 | 246 |
| 2×996+484-tone | 612 | (0.48)N/A |
| 3×996-tone | 732 | 366 |
| 3×996+484-tone | 852 | (0.48)N/A |
| 4×996-tone | 984 | 492 |

NEWLY DEFINED DOWNSIZE RATIO: $R_{downsize} = \dfrac{N_{st\_downsize}}{N_{st\_trigger}}$

POWER PRE-CORRECTION FOR DOWNSIZED UL TB PPDU:

$Tx_{pwr}^{STA} = PL_{DL} + Target_{RSSI} + 10 * log_{10}(R_{downsize})$

FIG. 8

ENCODING AND TRANSMIT POWER CONTROL FOR DOWNSIZED UPLINK TRIGGER-BASED PPDU TRANSMISSIONS IN NEXT-GENERATION WLAM SYSTEMS

CROSS REFERENCE TO RELATED PATENT APPLICATION

The present disclosure is part of a non-provisional patent application claiming the priority benefit of U.S. Provisional Patent Application No. 63/090,307, filed 12 Oct. 2020, the content of which being incorporated by reference in its entirety.

TECHNICAL FIELD

The present disclosure is generally related to wireless communications and, more particularly, to encoding and transmit power control for downsized trigger-based (TB) physical-layer protocol data unit (PPDU) transmissions in next-generation wireless local area network (WLAN) systems.

BACKGROUND

Unless otherwise indicated herein, approaches described in this section are not prior art to the claims listed below and are not admitted as prior art by inclusion in this section.

In wireless communications such as communications in a WLAN according to the Institute of Electrical and Electronics Engineers (IEEE) 802.11ax/be specifications, a non-access point (non-AP) station (STA) may not respond to a trigger frame if a channel sensing (CS) required field is set to 1 and a medium containing an allocated resource unit (RU) is busy as observed from the side of the trigger STA. In practical applications, a non-idle medium may be partially busy, rather than entirely busy, in a RU or a multi-RU (MRU, which is an aggregation of multiple RUs). To improve spectral efficiency of uplink (UL) TB PPDU transmissions, a downsized RU/MRU or partial bandwidth (BW) transmission scheme was proposed. Under that scheme, for an example, one STA may be triggered for UL orthogonal frequency-divisional multiple access (OFDMA) with assigned 996-tone RU (or RU996) for BW greater than or equal to 80 MHz. However, if one of the 20 MHz subchannels within the RU996 is busy for clear channel assessment (CCA), then the STA would not participate in an UL OFDMA transmission. To improve or otherwise enhance spectral efficiency, the STA may transmit an MRU of 242+484 tones, a 242-tone RU or a 484-tone RU in a downsized RU/MRU transmission (and hence such a STA is interchangeably referred to as a "downsized-transmission STA"). Nevertheless, with respect to partial BW (or downsized RU) UL TB PPDU transmission, certain aspects such as encoding process and transmit power control, for example, have yet to be defined. Therefore, there is a need for a solution for encoding and transmit power control for downsized TB PPDU transmissions in next-generation WLAN systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to encoding and transmit power control for downsized TB PPDU transmissions in next-generation WLAN systems. It is believed that the implementation of one or more of the various schemes proposed herein may address, avoid or otherwise alleviate issue(s) mentioned herein.

In one aspect, a method may involve receiving a trigger frame indicating an allocated RU of a first size. The method may also involve performing channel sensing responsive to receiving the trigger frame. In response to detecting at least one subchannel being busy from the channel sensing, the method may further involve performing a downsized TB transmission with a downsized RU or MRU of a second size smaller than the first size by utilizing downsized RU or MRU allocation information while maintaining a value of each of one or more parameters unchanged in an encoding process to perform the downsized TB transmission.

In another aspect, an apparatus may include a transceiver configured to communicate wirelessly and a processor coupled to the transceiver. The processor may receive, via the transceiver, a trigger frame indicating an allocated RU of a first size. The processor may also perform, via the transceiver, channel sensing responsive to receiving the trigger frame. In response to detecting at least one subchannel being busy from the channel sensing, the processor may perform, via the transceiver, a downsized TB transmission with a downsized RU or MRU of a second size smaller than the first size by utilizing downsized RU or MRU allocation information while maintaining a value of each of one or more parameters unchanged in an encoding process to perform the downsized TB transmission.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 6A and FIG. 6B each is a diagram of a portion of an example design in accordance with an implementation of the present disclosure.

FIG. 8 is a diagram of an example design in accordance with an implementation of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to encoding and transmit power control for downsized TB PPDU transmissions in next-generation WLAN systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU may be interchangeably denoted as RU26, a 52-tone regular RU may be interchangeably denoted as RU52, a 106-tone regular RU may be interchangeably denoted as RU106, a 242-tone regular RU may be interchangeably denoted as RU242, and so on. Moreover, an aggregate (26+52)-tone regular MRU may be interchangeably denoted as MRU78 or MRU(26+52), an aggregate (26+106)-tone regular MRU may be interchangeably denoted as MRU132 or MRU(26+106), an aggregate (242+484)-tone regular MRU may be interchangeably denoted as MRU726 or MRU(242+484), and so on. Since the above examples are merely illustrative examples and not an exhaustive listing of all possibilities, the same applies to regular RUs and MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320.

Figure 1:
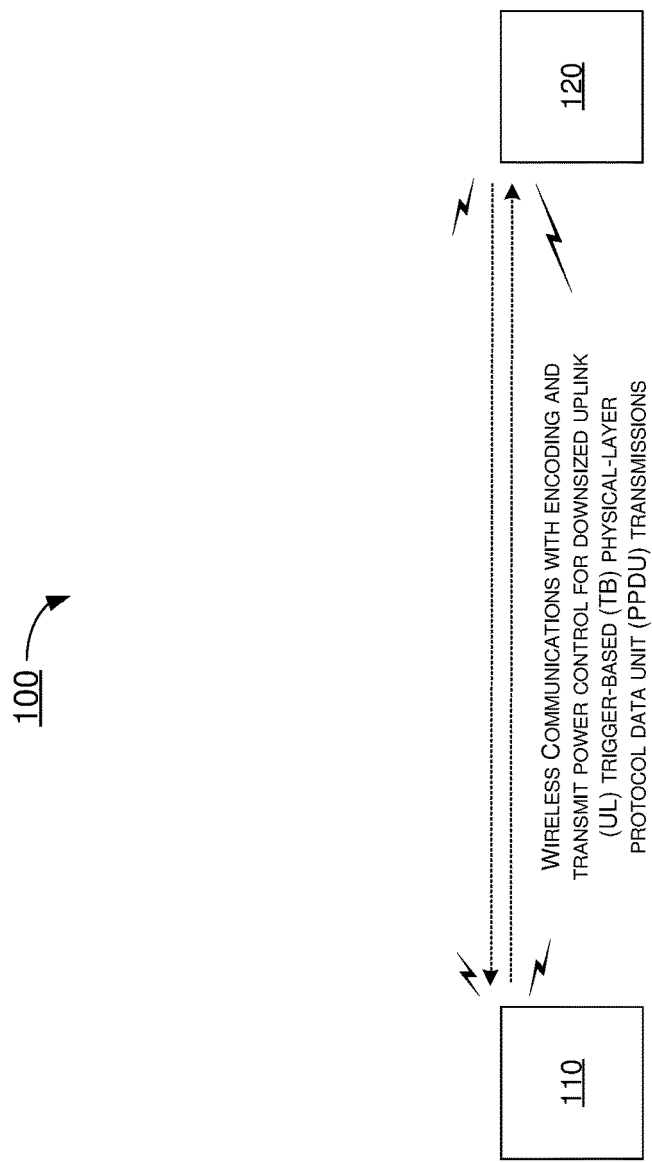
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 10 illustrate examples of implementation of various proposed schemes in network environment 100 in accordance with the present disclosure. The following description of various proposed schemes is provided with reference to FIG. 1~FIG. 10.

Referring to FIG. 1, network environment 100 may involve a communication entity 110 and a communication entity 120 communicating wirelessly (e.g., in a WLAN in accordance with one or more IEEE 802.11 standards). For instance, communication entity 110 may be a first STA and communication entity 120 may be a second STA, with each of the first STA and second STA functioning an access point (AP) STA or a non-AP STA. Under various proposed schemes in accordance with the present disclosure, communication entity 110 and communication entity 120 may be configured to communicate wirelessly with encoding and transmit power control for downsized TB PPDU transmissions in next-generation WLAN systems, as described herein.

Under a proposed scheme in accordance with the present disclosure with respect to data field encoding for downsized TB PPDU transmissions, all triggered STAs including downsized-transmission STAs may align to a same number of symbols ($N_{sym}$) and packet extension (PE). Downsized-transmission STAs may use or keep the same modulation coding scheme (MCS), number of spatial streams, per-forward error correction (FEC) padding factor, FEC coding type, and so on as signaled in a common field or user-specific field of a trigger frame (TF) in the encoding process. Additionally, the downsized-transmission STAs may replace the "RU Allocation" information in a user field with the STA's self-determined "Downsized RU/MRU Allocation" information in the encoding process. Under the proposed scheme, the encoding process may be applied for both downsized UL OFDMA transmissions and downsized UL multi-user multiple-input-multiple-output (MU-MIMO) transmissions.

Figure 2:
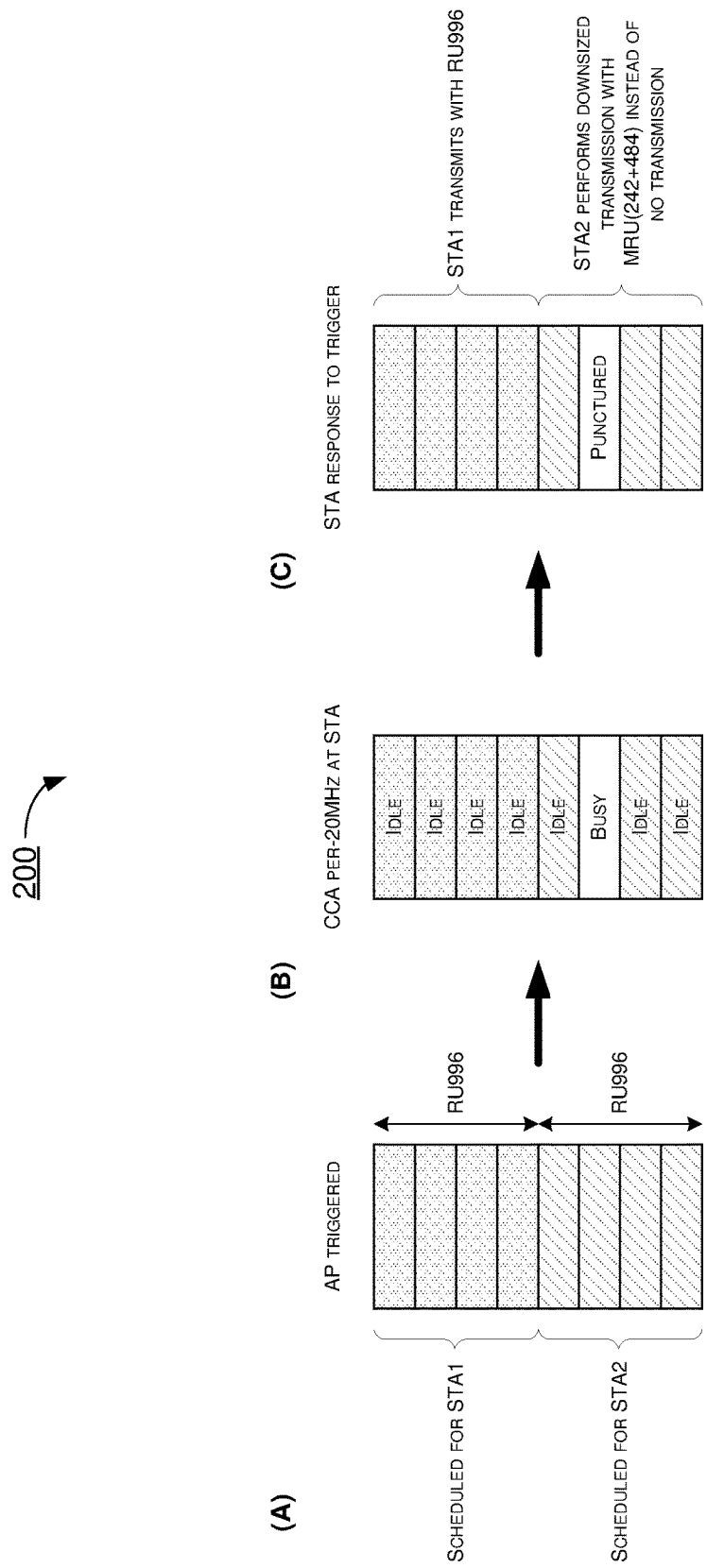
FIG. 2 is a diagram of an example scenario in accordance with an implementation of the present disclosure.

FIG. 2 illustrates an example scenario 200 in accordance with an implementation of the present disclosure. Referring to part (A) of scenario 200, an AP may trigger a first STA (or STA1) for an UL transmission on a first RU996 and may also trigger a second STA (or STA2) for another UL transmission on a second RU996. Referring to part (B) of scenario 200, based on a per-20 MHz subchannel CCA performed by STA1 and STA2 regarding the first RU996 and the second RU996, respectively, each of the four 20-MHz subchannels in the first RU996 may be deemed idle while, except for one busy 20-MHz subchannel, the other three of the four 20-MHz subchannels in the second RU996 may be deemed idle. Referring to part (C) of scenario 200, STA1 may perform its UL transmission on the first RU996. Moreover, instead of performing no transmission, STA2 may perform a downsized UL transmission on an MRU242+484 corresponding to the three idle 20-MHz subchannels. That is, the UL transmission by STA2 may be downsized from a RU996 to an MRU(242+484). Accordingly, STA2 may need to signal or otherwise indicate information on the downsized RU/MRU to the AP.

Figure 3:
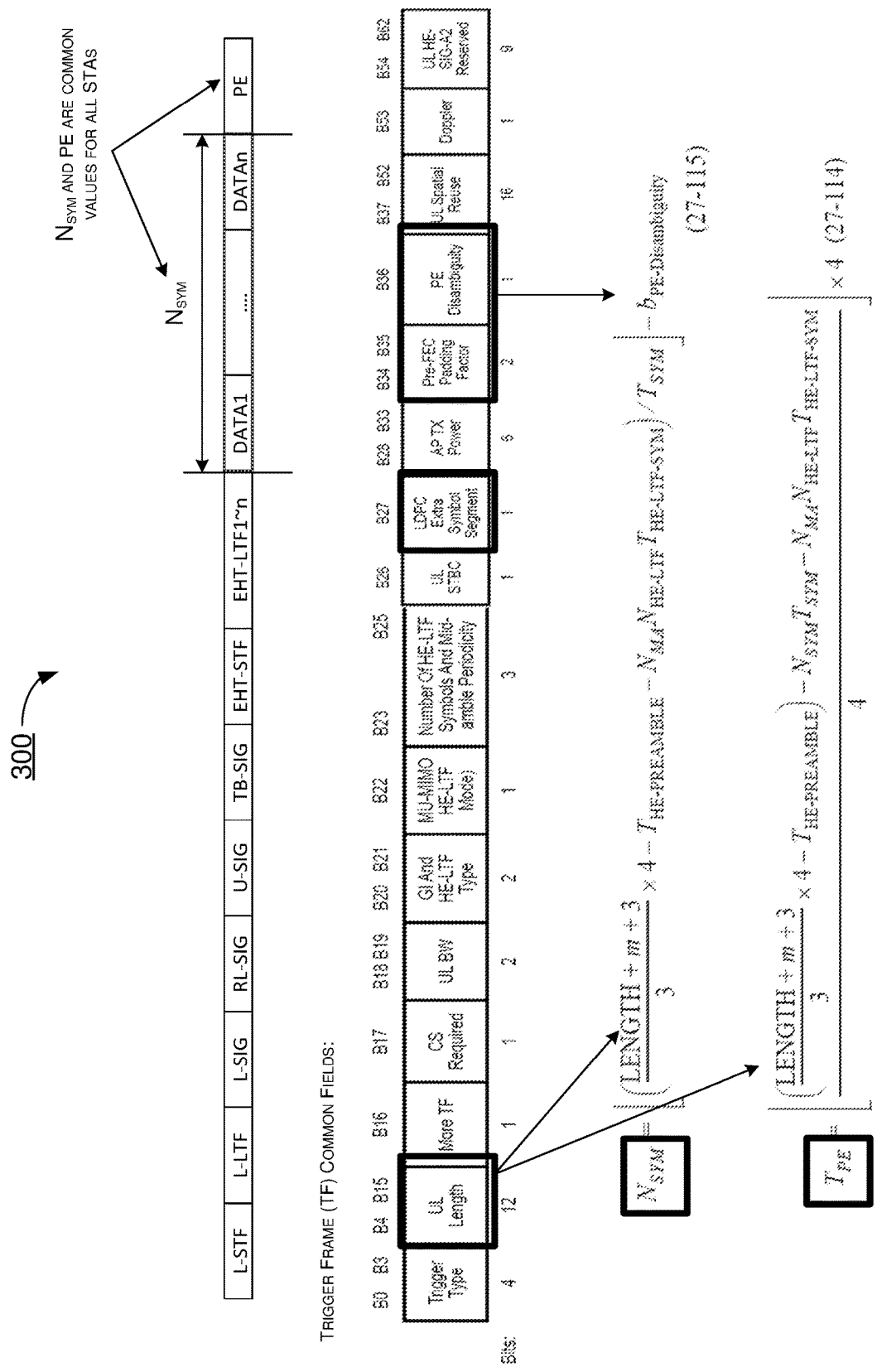
FIG. 3 is a diagram of an example design in accordance with an implementation of the present disclosure.

FIG. 3 illustrates an example design 300 under a proposed scheme in accordance with an implementation of the present disclosure. Under the proposed scheme, all downsized TB PPDUs may align to the same $N_{sym}$ and PE, as common values for all STAs, which may be calculated from the trigger frame (e.g., based on information in TF Common Fields). For instance, a downsized-transmission STA may utilize the same parameters carried in a common field in the TF to calculate $N_{sym}$ and PE.

Figure 4:
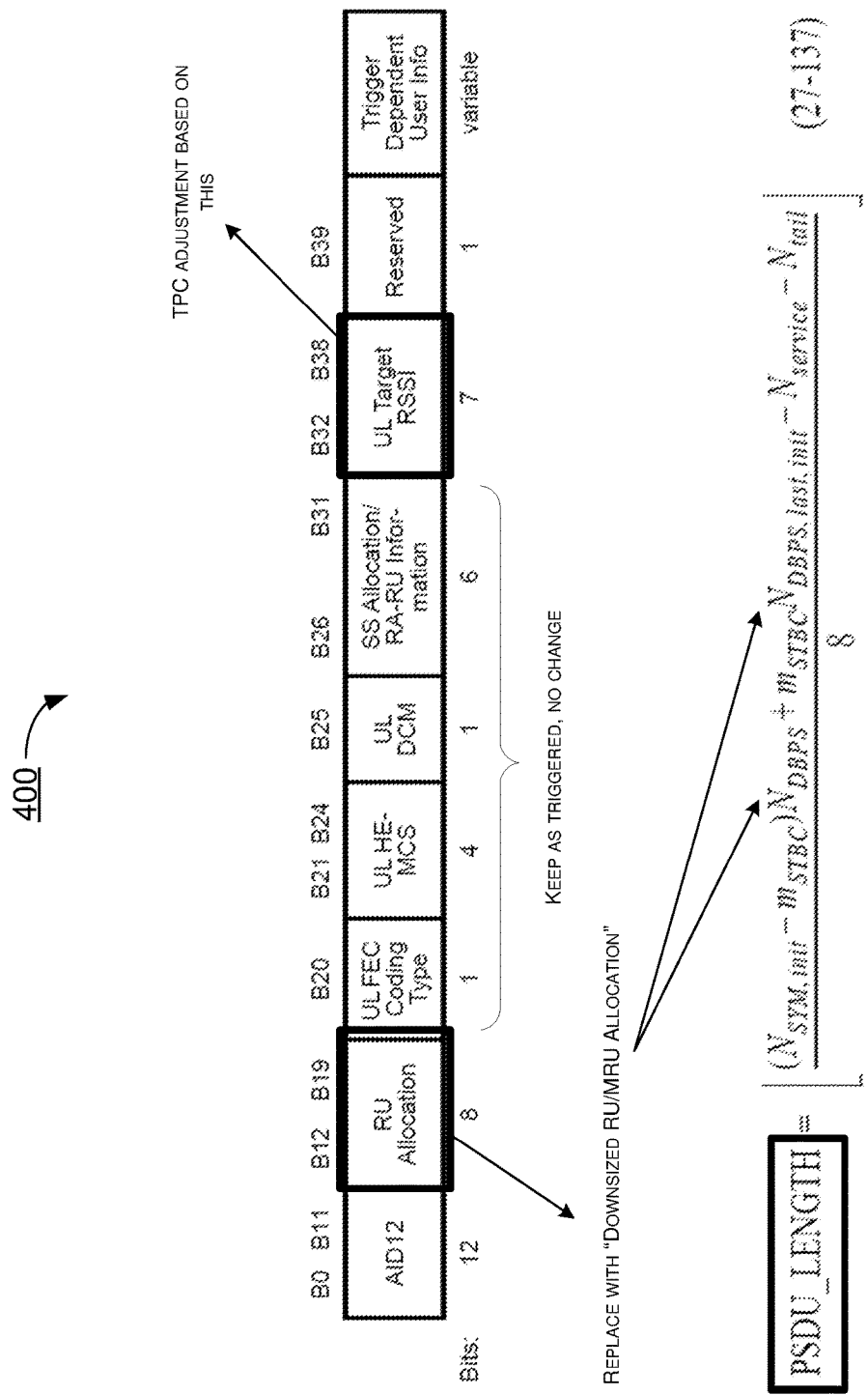
FIG. 4 is a diagram of an example design in accordance with an implementation of the present disclosure.

FIG. 4 illustrates an example design 400 under a proposed scheme in accordance with an implementation of the present disclosure. Under the proposed scheme, a downsized-transmission STAs may replace the "RU Allocation" information in a user field with the STA's self-determined "Downsized RU/MRU Allocation" information in the data field encoding process. Overall encoding process may be transparent to the downsized RU. Referring to FIG. 4, design 400 shows an example of calculation of a length of a Physical Layer Convergence Protocol (PLCP) service data unit (PSDU).

Figure 5:
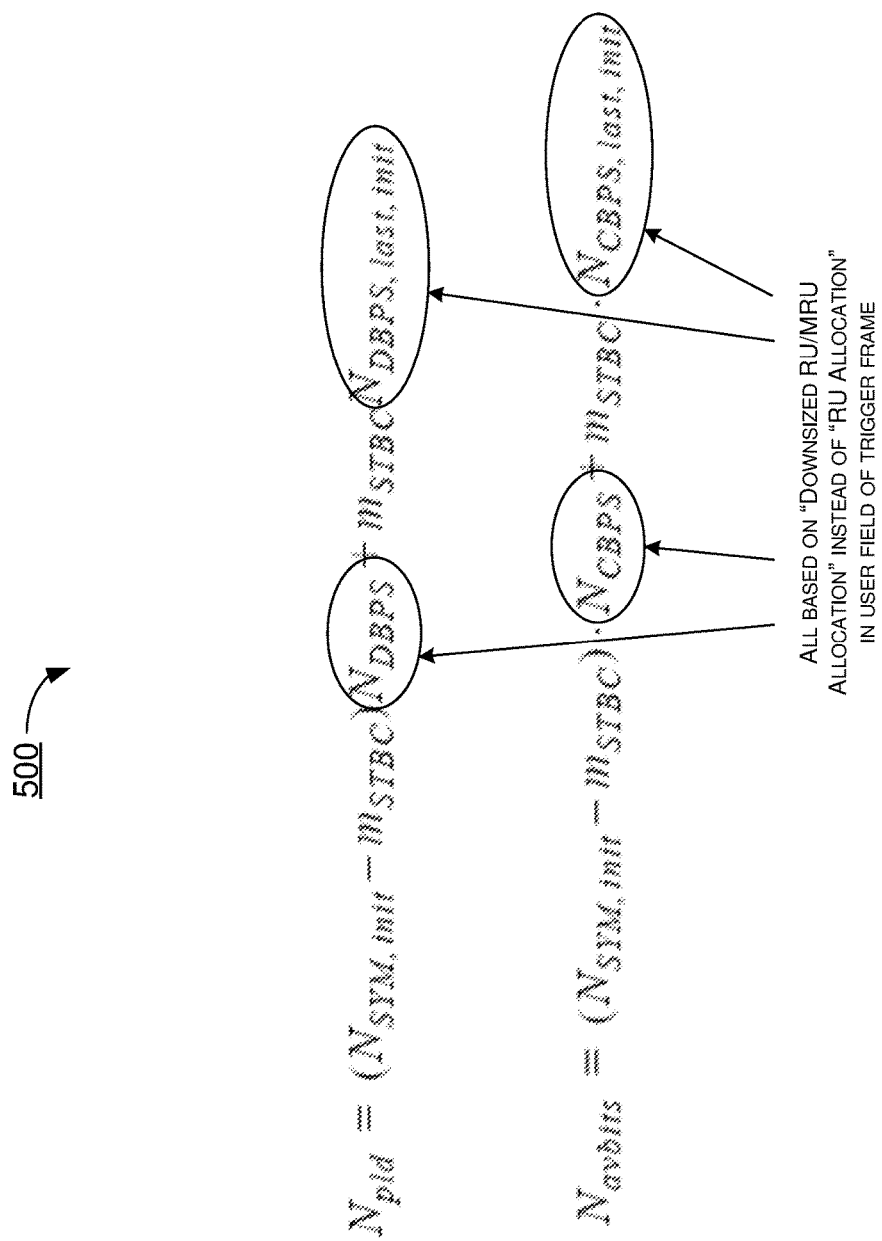
FIG. 5 is a diagram of an example design in accordance with an implementation of the present disclosure.

FIG. 5 illustrates an example design 500 under a proposed scheme in accordance with an implementation of the present disclosure. Under the proposed scheme, pre-FEC padding, post-FEC padding, and binary convolutional codes (BCC)/ low-density parity-check (LDPC) encoding may be transparent by simply replacing the "RU Allocation" information with "Downsized RU/MRU Allocation" information in the encoding process. All the equations and formulas may be reused. Referring to FIG. 5, design 500 shows an example of LDPC encoding for a downsized RU/MRU transmission. In design 500, all of the number of data bits per OFDM symbol ($N_{DBPS}$) and the number of coded bits per OFDM symbol ($N_{CBPS}$) may be based on the "Downsized RU/MRU Allocation" information instead of "RU Allocation" information in the user field of the trigger frame.

Figure 6B:
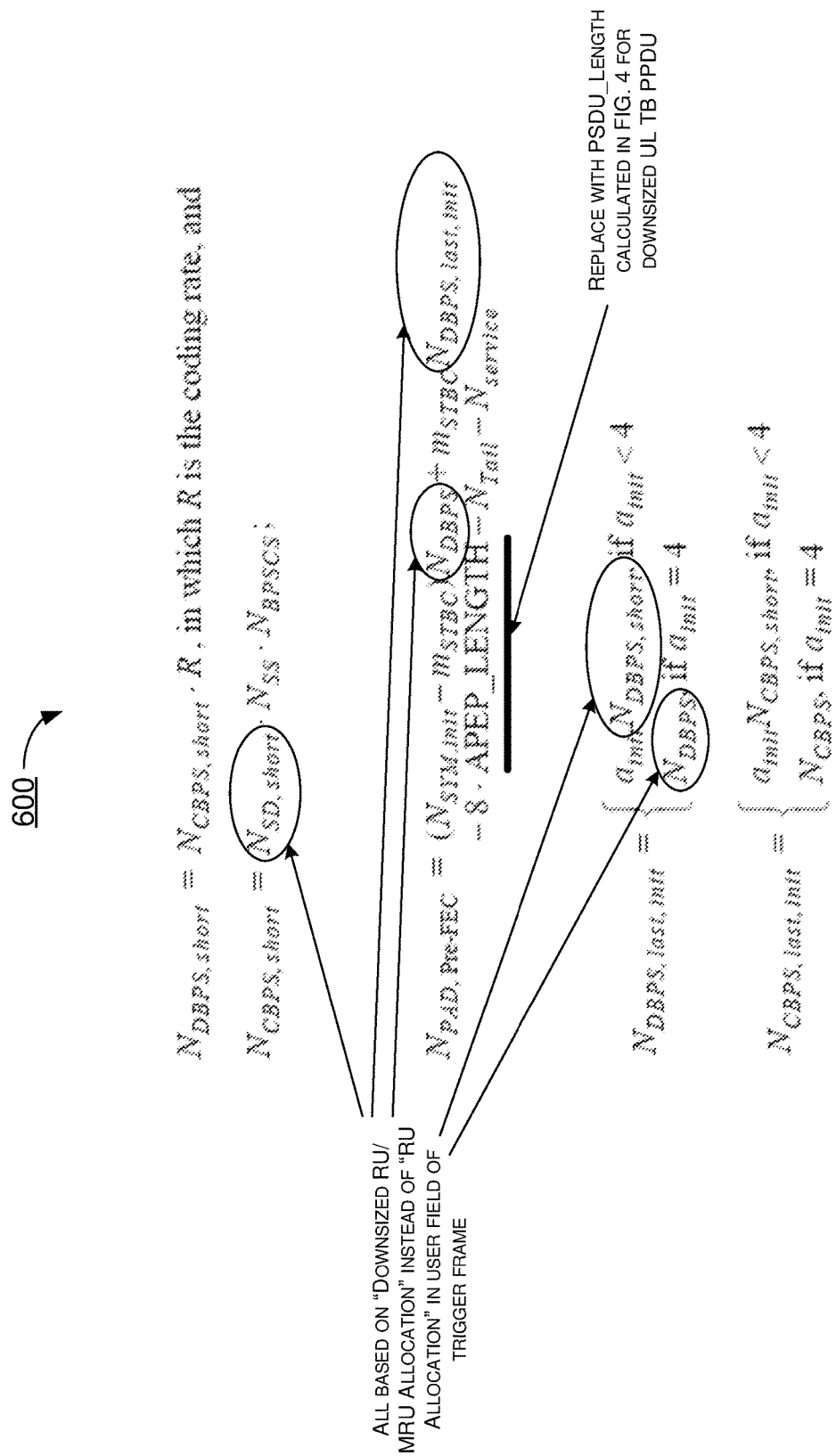

FIG. 6A and FIG. 6B together illustrate an example design 600 under a proposed scheme in accordance with an implementation of the present disclosure. Under the proposed scheme, for a downsized UL TB PPDU, the length of an aggregate medium access control (MAC) protocol data unit (A-MPDU) pre-end of frame (EOF) padding may be replaced with the PSDU length calculated in design 400. Moreover, all of the number of data subcarriers ($N_{SD}$) and a parameter $N_{SD,short}$ (the number of data subcarriers for downsized RU/MRU used in a pre-FEC padding process), the number of data bits per OFDM symbol ($N_{DBPS}$) and a parameter $N_{DBPS,short}$ (the number of data bits per OFDM symbol for downsized RU/MRU used in the pre-FEC padding process) as well as the number of coded bits per OFDM symbol ($N_{CBPS}$) and a parameter $N_{CBPS,short}$ (the number of coded bits per OFDM symbol for downsized RU/MRU used in the pre-FEC padding process) may be based on the "Downsized RU/MRU Allocation" information instead of "RU Allocation" information in the user field of the trigger frame. Referring to FIG. 6A, in design 600, the value of $N_{SD,short}$ may be based on a second size of RU/MRU (e.g., downsized RU/MRU), instead of a first size of RU/MRU (e.g., original RU/MRU before downsizing), and corresponding to a respective MCS for the RU/MRU size. Referring to FIG. 6B, design 600 shows an example of pre-FEC padding in encoding for a downsized TB transmission. As shown in FIG. 6B, the value of $N_{CBPS,short}$ may be determined based on $N_{SD,short}$, and the value of $N_{DBPS,short}$ may be determined based on $N_{CBPS,short}$.

Figure 7:
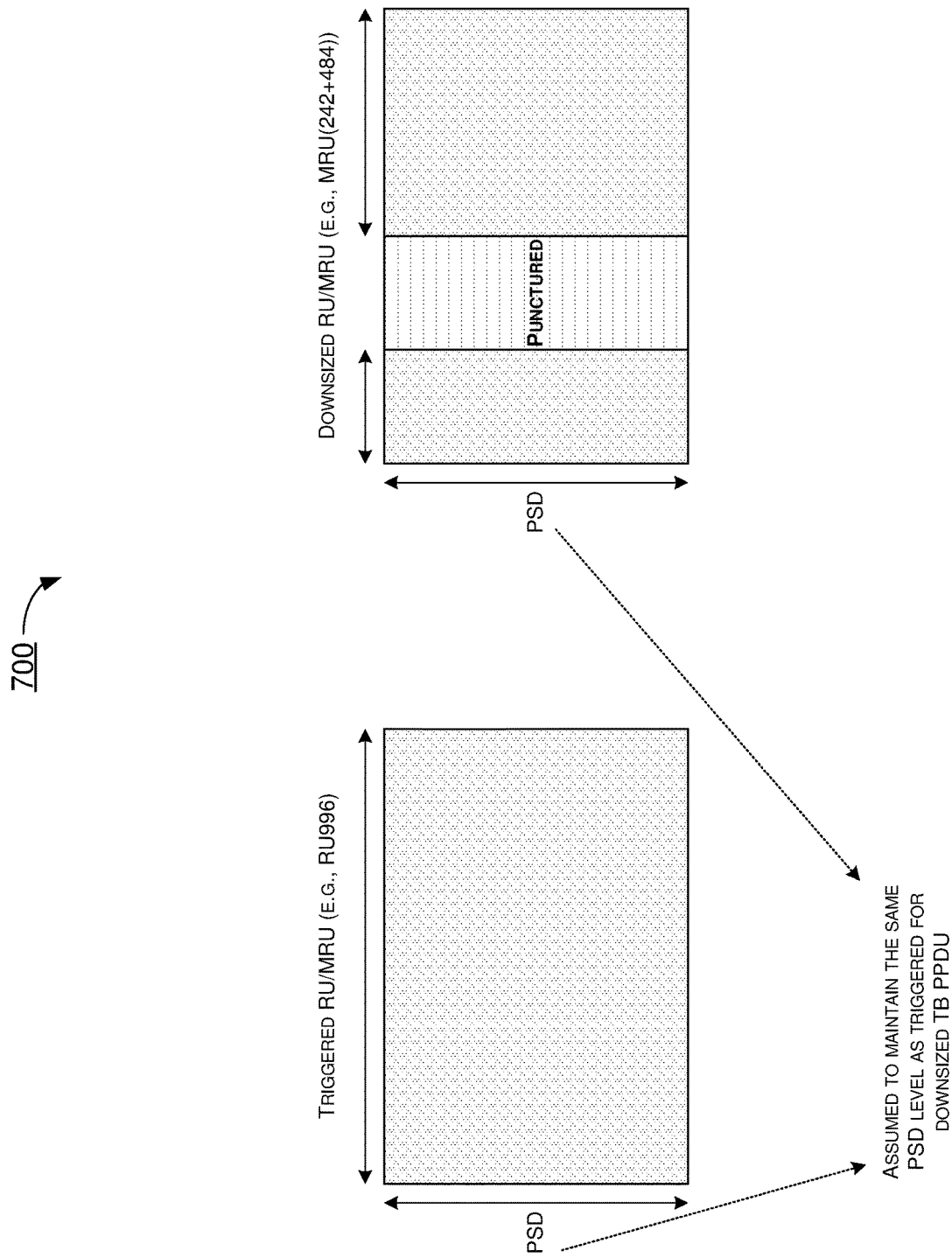
FIG. 7 is a diagram of an example scenario in accordance with an implementation of the present disclosure.

FIG. 7 illustrates an example scenario 700 under a proposed scheme in accordance with an implementation of the present disclosure. In IEEE 802.11ax/be, each STA with UL TB PPDU transmission is required to perform power pre-correction based on the following formula regarding downlink (DL) path loss ($PL_{DL}$): $PL_{DL} = Tx_{pwr}^{AP} - DL_{RSSI}$. That is, the DL path loss may be determined or otherwise calculated by subtracting a value of a DL received signal strength indicator ($DL_{RSSI}$) from a level of transmit power specified or otherwise indicated in the trigger frame (e.g., $TX^{AP}_{pwr}$) received from an AP. Under the proposed scheme, for a downsized UL TB PPDU transmission, by assuming to keep the same MCS and number of spatial streams ($N_{SS}$) as signaled in the trigger frame, in performing power pre-correction (or power control) for the downsized TB PPDU transmission, a STA may maintain the power spectral density (PSD) as specified in the trigger frame by adjusting or otherwise scaling the STA's transmit power accordingly based on the ratio of the triggered RU/MRU versus the downsized RU/MRU. More specifically, while the trigger frame may assign a value for RSSI for use in calculating the DL path loss, the actual transmit power in performing a downsized TB transmission may be based on the size of the downsized RU/MRU used in the downsized TB transmission. Thus, the STA may scale the transmit power according to a ratio of the downsized RU/MRU to the allocated RU as indicated in the trigger frame, while keeping PSD level the same as originally triggered (or first size RU/MRU) transmission. Referring to FIG. 7, scenario 700 shows an illustrative example of a triggered RU/MRU being a RU996 with a downsized RU/MRU being RU(242+484), while the same PSD level as triggered is maintained for the downsized TB PPDU.

FIG. 8 illustrates an example design 800 under a proposed scheme in accordance with an implementation of the present disclosure. Under the proposed scheme, a downsize ratio ($R_{downsize}$) may be defined as a ratio between a downsized total number of subcarriers in a RU/MRU ($N_{st\_downsize}$) to a triggered total number of subcarriers in a RU/MRU ($N_{st\_trigger}$), including both data tones and pilot tones. Referring to FIG. 8, scenario 800 shows an example design 800 for power control of the transmit power of a downsized-transmission STA. Specifically, calculation of the power pre-correction for a downsized UL TB PPDU transmission may be extended by $10*\log_{10}(R_{downsize})$.

Illustrative Implementations

Figure 9:
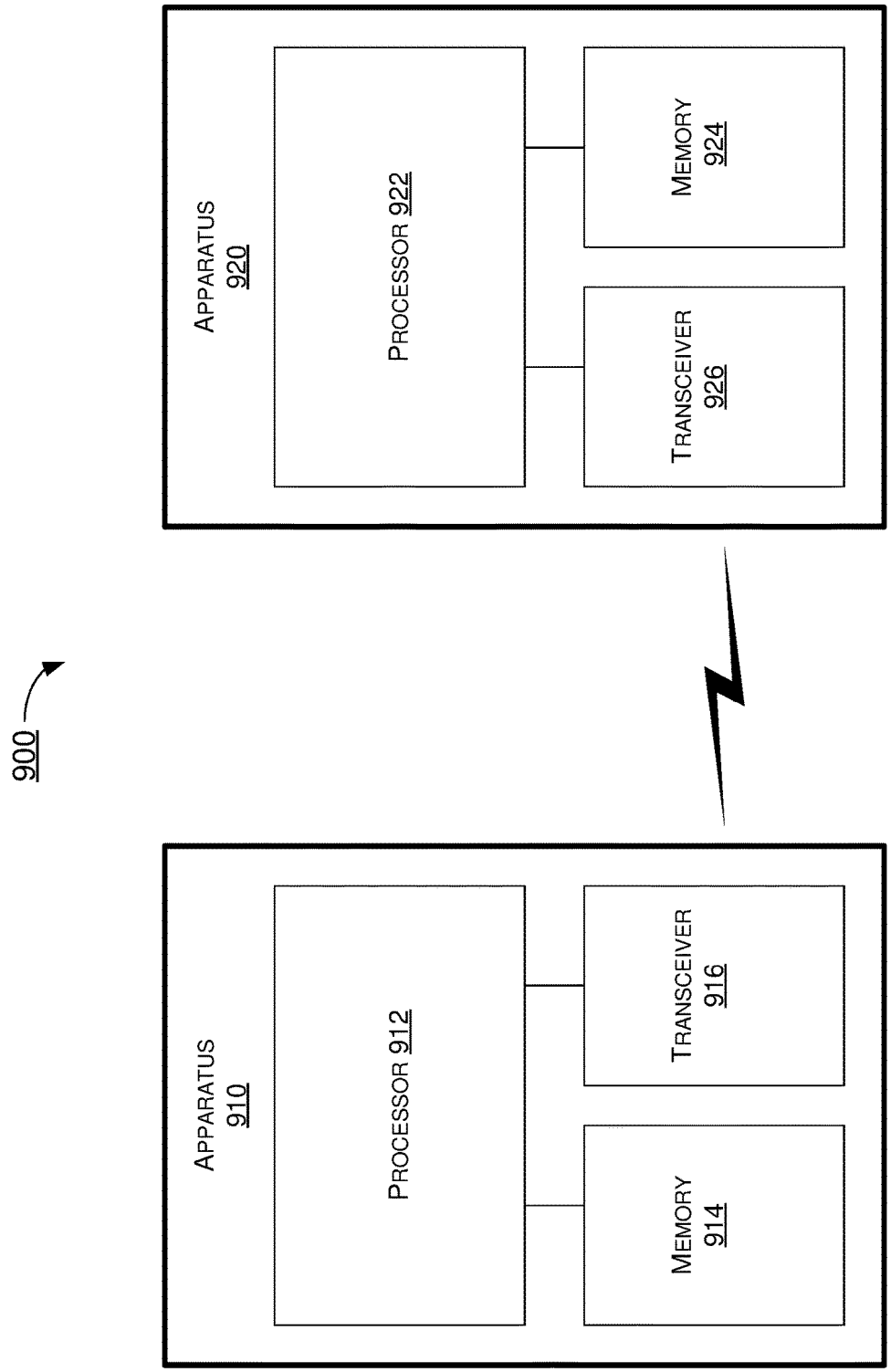
FIG. 9 is a block diagram of an example communication system in accordance with an implementation of the present disclosure.

FIG. 9 illustrates an example system 900 having at least an example apparatus 910 and an example apparatus 920 in accordance with an implementation of the present disclosure. Each of apparatus 910 and apparatus 920 may perform various functions to implement schemes, techniques, processes and methods described herein pertaining to encoding and transmit power control for downsized TB PPDU transmissions in next-generation WLAN systems, including the various schemes described above with respect to various proposed designs, concepts, schemes, systems and methods described above as well as processes described below. For instance, apparatus 910 may be an example implementation of communication entity 110, and apparatus 920 may be an example implementation of communication entity 120.

Each of apparatus 910 and apparatus 920 may be a part of an electronic apparatus, which may be a STA or an AP, such as a portable or mobile apparatus, a wearable apparatus, a wireless communication apparatus or a computing apparatus. For instance, each of apparatus 910 and apparatus 920 may be implemented in a smartphone, a smart watch, a personal digital assistant, a digital camera, or a computing equipment such as a tablet computer, a laptop computer or a notebook computer. Each of apparatus 910 and apparatus 920 may also be a part of a machine type apparatus, which may be an IoT apparatus such as an immobile or a stationary apparatus, a home apparatus, a wire communication apparatus or a computing apparatus. For instance, each of apparatus 910 and apparatus 920 may be implemented in a smart thermostat, a smart fridge, a smart door lock, a wireless speaker or a home control center. When implemented in or as a network apparatus, apparatus 910 and/or apparatus 920 may be implemented in a network node, such as an AP in a WLAN.

In some implementations, each of apparatus 910 and apparatus 920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 910 and apparatus 920 may be implemented in or as a STA or an AP. Each of apparatus 910 and apparatus 920 may include at least some of those components shown in FIG. 9 such as a processor 912 and a processor 922, respectively, for example. Each of apparatus 910 and apparatus 920 may further include one or more other components not pertinent to the proposed scheme of the present disclosure (e.g., internal power supply, display device and/or user interface device), and, thus, such component(s) of apparatus 910 and apparatus 920 are neither shown in FIG. 9 nor described below in the interest of simplicity and brevity.

In one aspect, each of processor 912 and processor 922 may be implemented in the form of one or more single-core processors, one or more multi-core processors, one or more RISC processors or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including those pertaining to encoding and transmit power control for downsized TB PPDU transmissions in next-generation WLAN systems in accordance with various implementations of the present disclosure. For instance, each of processor 912 and processor 922 may be configured with hardware components, or circuitry, implementing one, some or all of the examples described and illustrated herein.

In some implementations, apparatus 910 may also include a transceiver 916 coupled to processor 912. Transceiver 916 may be capable of wirelessly transmitting and receiving data. In some implementations, apparatus 920 may also include a transceiver 926 coupled to processor 922. Transceiver 926 may include a transceiver capable of wirelessly transmitting and receiving data.

In some implementations, apparatus 910 may further include a memory 914 coupled to processor 912 and capable of being accessed by processor 912 and storing data therein. In some implementations, apparatus 920 may further include a memory 924 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 910 and apparatus 920 may be a communication entity capable of communicating with each other using various proposed schemes in accordance with the present disclosure. For illustrative purposes and without limitation, a description of capabilities of apparatus 910, as communication entity 110 (e.g., a non-AP STA), and apparatus 920, as communication entity 120 (e.g., an AP STA), is provided below. It is noteworthy that, although the example implementations described below are provided in the context of WLAN, the same may be implemented in other types of networks.

Under a proposed scheme in accordance with the present disclosure with respect to encoding and transmit power control for downsized TB PPDU transmissions in next-generation WLAN systems, processor 912 of apparatus 910 may receive, via transceiver 916, a trigger frame indicating an allocated RU of a first size. Additionally, processor 912 may perform, via transceiver 916, channel sensing responsive to receiving the trigger frame. Moreover, in response to detecting at least one subchannel being busy from the channel sensing, processor 912 may perform, via transceiver 916, a downsized TB transmission with a downsized RU or MRU of a second size smaller than the first size by utilizing downsized RU or MRU allocation information while maintaining a value of each of one or more parameters unchanged in an encoding process to perform the downsized TB transmission (e.g., as with performing a TB transmission with the allocated RU without downsizing).

In some implementations, in utilizing the downsized RU or MRU allocation information, processor 912 may calculate a packet size of the downsized TB transmission based on the second size of the downsized RU or MRU instead of using RU allocation information in a user field of the trigger frame.

In some implementations, in utilizing the downsized RU or MRU allocation information, processor 912 may calculate a number of data bits per OFDMA symbol ($N_{DBPS}$) and a number of coded bits per OFDM symbol ($N_{CBPS}$) in performing LDPC encoding in the encoding process based on the second size of the downsized RU or MRU instead of using RU allocation information in a user field of the trigger frame.

In some implementations, in utilizing the downsized RU or MRU allocation information, processor 912 may calculate a number of data subcarriers ($N_{SD}$) and a number of data subcarriers for the downsized RU or MRU ($N_{SD,short}$) used in a pre-FEC padding process, a number of data bits per OFDM symbol ($N_{DBPS}$) and a number of data bits per OFDM symbol for the downsized RU or MRU ($N_{DBPS,short}$) used in the pre-FEC padding process, a number of coded bits per OFDM symbol ($N_{CBPS}$) and a number of coded bits per OFDM symbol for the downsized RU or MRU ($N_{CBPS,short}$) used in the pre-FEC padding process in performing pre-FEC padding in the encoding process based on the second size of the downsized RU or MRU instead of using RU allocation information in a user field of the trigger frame.

In some implementations, in maintaining the value of each of one or more parameters unchanged, processor 912 may maintain a number of symbols ($N_{sym}$) and a packet extension unchanged in the encoding process.

In some implementations, in maintaining the value of each of one or more parameters unchanged, processor 912 may maintain a MCS, a number of spatial streams ($N_{SS}$), a pre-FEC padding factor, a FEC coding type as signaled in a common field or a user-specific field of the trigger frame in the encoding process.

In some implementations, the downsized TB transmission may include a downsized UL OFDMA transmission. Alternatively, the downsized TB transmission may include a downsized UL MU-MIMO transmission.

In some implementations, in performing the downsized TB transmission, processor 912 may perform certain operations. For instance, processor 912 may maintain a PSD unchanged in performing the downsized TB transmission as indicated in the trigger frame. Additionally, processor 912 may adjust a transmit power in performing the downsized TB transmission based on the second size of the downsized RU or MRU instead of using RU allocation information in a user field of the trigger frame.

In some implementations, in adjusting the transmit power, processor 912 may perform certain operations. For instance, processor 912 may calculate a value of a downsize ratio ($R_{downsize}$) as a ratio of a total number of subcarriers in the downsized RU or MRU to a total number of subcarriers in the allocated RU in the trigger frame. Moreover, processor 912 may calculate the transmit power based on a DL path loss ($PL_{DL}$), a target received signal strength indicator ($Target_{RSSI}$) and a log-based value of the downsize ratio (e.g., $10*\log_{10}R_{downsize}$).

Illustrative Processes

Figure 10:
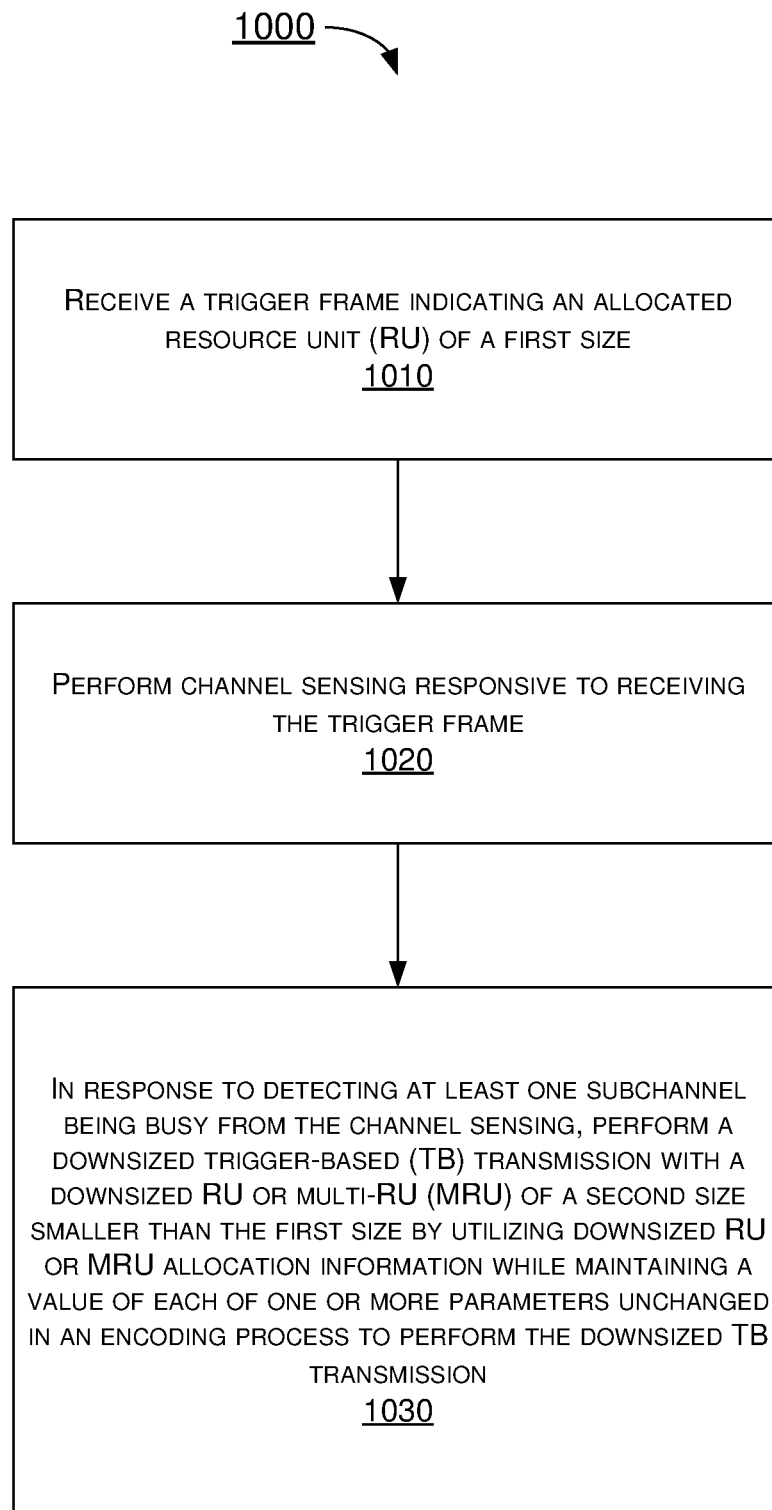
FIG. 10 is a flowchart of an example process in accordance with an implementation of the present disclosure.

FIG. 10 illustrates an example process 1000 in accordance with an implementation of the present disclosure. Process 1000 may represent an aspect of implementing various proposed designs, concepts, schemes, systems and methods described above. More specifically, process 1000 may represent an aspect of the proposed concepts and schemes pertaining to encoding and transmit power control for downsized TB PPDU transmissions in next-generation WLAN systems in accordance with the present disclosure. Process 1000 may include one or more operations, actions, or functions as illustrated by one or more of blocks 1010, 1020 and 1030. Although illustrated as discrete blocks, various blocks of process 1000 may be divided into additional blocks, combined into fewer blocks, or eliminated, depending on the desired implementation. Moreover, the blocks/sub-blocks of process 1000 may be executed in the order shown in FIG. 10 or, alternatively in a different order. Furthermore, one or more of the blocks/sub-blocks of process 1000 may be executed repeatedly or iteratively. Process 1000 may be implemented by or in apparatus 910 and apparatus 920 as well as any variations thereof. Solely for illustrative purposes and without limiting the scope, process 1000 is described below in the context of apparatus 910 as communication entity 110 (e.g., a non-AP STA) and apparatus 920 as communication entity 120 (e.g., an AP STA) of a wireless network such as a WLAN in accordance with one or more of IEEE 802.11 standards. Process 1000 may begin at block 1010.

At 1010, process 1000 may involve processor 912 of apparatus 910 receiving, via transceiver 916, a trigger frame indicating an allocated RU of a first size. Process 1000 may proceed from 1010 to 1020.

At 1020, process 1000 may involve processor 912 performing, via transceiver 916, channel sensing responsive to receiving the trigger frame. Process 1000 may proceed from 1020 to 1030.

At 1030, process 1000 may involve processor 912, in response to detecting at least one subchannel being busy from the channel sensing, performing, via transceiver 916, a downsized TB transmission with a downsized RU or MRU of a second size smaller than the first size by utilizing downsized RU or MRU allocation information while maintaining a value of each of one or more parameters unchanged in an encoding process to perform the downsized TB transmission (e.g., as with performing a TB transmission with the allocated RU without downsizing).

In some implementations, in utilizing the downsized RU or MRU allocation information, process 1000 may involve processor 912 calculating a packet size of the downsized TB transmission based on the second size of the downsized RU or MRU instead of using RU allocation information in a user field of the trigger frame.

In some implementations, in utilizing the downsized RU or MRU allocation information, process 1000 may involve processor 912 calculating a number of data bits per OFDMA symbol ($N_{DBPS}$) and a number of coded bits per OFDM symbol ($N_{CBPS}$) in performing LDPC encoding in the encoding process based on the second size of the downsized RU or MRU instead of using RU allocation information in a user field of the trigger frame.

In some implementations, in utilizing the downsized RU or MRU allocation information, process 1000 may involve processor 912 calculating a number of data subcarriers ($N_{SD}$) and a number of data subcarriers for the downsized RU or MRU ($N_{SD,short}$) used in a pre-FEC padding process, a number of data bits per OFDM symbol ($N_{DBPS}$) and a number of data bits per OFDM symbol for the downsized RU or MRU ($N_{DBPS,short}$) used in the pre-FEC padding process, a number of coded bits per OFDM symbol ($N_{CBPS}$) and a number of coded bits per OFDM symbol for the downsized RU or MRU ($N_{CBPS,short}$) used in the pre-FEC padding process in performing pre-FEC padding in the encoding process based on the second size of the downsized RU or MRU instead of using RU allocation information in a user field of the trigger frame.

In some implementations, in maintaining the value of each of one or more parameters unchanged, process 1000 may involve processor 912 maintaining a number of symbols ($N_{sym}$) and a packet extension unchanged in the encoding process.

In some implementations, in maintaining the value of each of one or more parameters unchanged, process 1000 may involve processor 912 maintaining a MCS, a number of spatial streams ($N_{SS}$), a pre-FEC padding factor, a FEC coding type as signaled in a common field or a user-specific field of the trigger frame in the encoding process.

In some implementations, the downsized TB transmission may include a downsized UL OFDMA transmission. Alternatively, the downsized TB transmission may include a downsized UL MU-MIMO transmission.

In some implementations, in performing the downsized TB transmission, process 1000 may involve processor 912 performing certain operations. For instance, process 1000 may involve processor 912 maintaining a PSD unchanged in performing the downsized TB transmission as indicated in the trigger frame. Additionally, process 1000 may involve processor 912 adjusting a transmit power in performing the downsized TB transmission based on the second size of the downsized RU or MRU instead of using RU allocation information in a user field of the trigger frame.

In some implementations, in adjusting the transmit power, process 1000 may involve processor 912 performing certain operations. For instance, process 1000 may involve processor 912 calculating a value of a downsize ratio ($R_{downsize}$) as a ratio of a total number of subcarriers in the downsized RU or MRU to a total number of subcarriers in the allocated RU in the trigger frame. Moreover, process 1000 may involve processor 912 calculating the transmit power based on a DL path loss ($PL_{DL}$), a target received signal strength indicator ($Target_{RSSI}$) and a log-based value of the downsize ratio (e.g., $10*\log_{10}R_{downsize}$).

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving a trigger frame indicating an allocated resource unit (RU) of a first size;
   performing channel sensing responsive to receiving the trigger frame; and
   performing a downsized trigger-based (TB) transmission with a downsized RU or multi-RU (MRU) of a second size smaller than the first size responsive to detecting at least one subchannel being busy from the channel sensing,
   wherein the performing of the downsized TB transmission comprises utilizing downsized RU or MRU allocation information while maintaining a value of each of one or more parameters unchanged in an encoding process to perform the downsized TB transmission.

2. The method of claim 1, wherein the utilizing of the downsized RU or MRU allocation information comprises calculating a packet size of the downsized TB transmission based on the second size of the downsized RU or MRU instead of using RU allocation information in a user field of the trigger frame.

3. The method of claim 1, wherein the utilizing of the downsized RU or MRU allocation information comprises calculating a number of data bits per orthogonal frequency-division multiplexing (OFDM) symbol ($N_{DBPS}$) and a number of coded bits per OFDM symbol ($N_{CBPS}$) in performing low-density parity-check (LDPC) encoding in the encoding process based on the second size of the downsized RU or MRU instead of using RU allocation information in a user field of the trigger frame.

4. The method of claim 1, wherein the utilizing of the downsized RU or MRU allocation information comprises calculating a number of data subcarriers ($N_{SD}$) and a parameter $N_{SD,short}$ which is a number of data subcarriers for the downsized RU or MRU used in a pre-forward error correction (pre-FEC) padding process, a number of data bits per orthogonal frequency-division multiplexing (OFDM) symbol ($N_{DBPS}$) and a parameter $N_{DBPS,short}$ which is a number of data bits per OFDM symbol for the downsized RU or MRU used in the pre-FEC padding process, a number of coded bits per OFDM symbol ($N_{CBPS}$) and a parameter $N_{CBPS,short}$ which is a number of coded bits per OFDM symbol for the downsized RU or MRU used in the pre-FEC padding process in performing pre-FEC padding in the encoding process based on the second size of the downsized RU or MRU instead of using RU allocation information in a user field of the trigger frame.

5. The method of claim 1, wherein the maintaining of the value of each of one or more parameters unchanged comprises maintaining a number of symbols ($N_{sym}$) and a packet extension unchanged in the encoding process.

6. The method of claim 1, wherein the maintaining of the value of each of one or more parameters unchanged comprises maintaining a modulation coding scheme (MCS), a number of spatial streams ($N_{SS}$), a pre-forward error correction (FEC) padding factor, a FEC coding type as signaled in a common field or a user-specific field of the trigger frame in the encoding process.

7. The method of claim 1, wherein the downsized TB transmission comprises a downsized uplink (UL) orthogonal frequency-divisional multiple access (OFDMA) transmission.

8. The method of claim 1, wherein the downsized TB transmission comprises a downsized uplink (UL) multi-user multiple-input-multiple-output (MU-MIMO) transmission.

9. The method of claim 1, wherein the performing of the downsized TB transmission comprises:
maintaining a power spectral density (PSD) unchanged in performing the downsized TB transmission as indicated in the trigger frame; and
adjusting a transmit power in performing the downsized TB transmission based on the second size of the downsized RU or MRU instead of using RU allocation information in a user field of the trigger frame.

10. The method of claim 9, wherein the adjusting of the transmit power comprises:
calculating a value of a downsize ratio as a ratio of a total number of subcarriers in the downsized RU or MRU to a total number of subcarriers in the allocated RU in the trigger frame; and
calculating the transmit power based on a downlink (DL) path loss ($PL_{DL}$), a target received signal strength indicator ($Target_{RSSI}$) and a log-based value of the downsize ratio.

11. An apparatus, comprising:
a transceiver configured to communicate wirelessly; and
a processor coupled to the transceiver and configured to perform operations comprising:
receiving, via the transceiver, a trigger frame indicating an allocated resource unit (RU) of a first size;
performing, via the transceiver, channel sensing responsive to receiving the trigger frame; and
performing, via the transceiver, a downsized trigger-based (TB) transmission with a downsized RU or multi-RU (MRU) of a second size smaller than the first size responsive to detecting at least one subchannel being busy from the channel sensing,
wherein, in performing the downsized TB transmission, the processor is configured to utilize downsized RU or MRU allocation information while maintaining a value of each of one or more parameters unchanged in an encoding process to perform the downsized TB transmission.

12. The apparatus of claim 11, wherein, in utilizing the downsized RU or MRU allocation information, the processor is configured to calculate a packet size of the downsized TB transmission based on the second size of the downsized RU or MRU instead of using RU allocation information in a user field of the trigger frame.

13. The apparatus of claim 11, wherein, in utilizing the downsized RU or MRU allocation information, the processor is configured to calculate a number of data bits per orthogonal frequency-division multiplexing (OFDM) symbol ($N_{DBPS}$) and a number of coded bits per OFDM symbol ($N_{CBPS}$) in performing low-density parity-check (LDPC) encoding in the encoding process based on the second size of the downsized RU or MRU instead of using RU allocation information in a user field of the trigger frame.

14. The apparatus of claim 11, wherein, in utilizing the downsized RU or MRU allocation information, the processor is configured to calculate a number of data subcarriers ($N_{SD}$) and a parameter $N_{SD,short}$ which is a number of data subcarriers for the downsized RU or MRU used in a pre-forward error correction (pre-FEC) padding process, a number of data bits per orthogonal frequency-division multiplexing (OFDM) symbol ($N_{DBPS}$) and a parameter $N_{DBPS,short}$ which is a number of data bits per OFDM symbol for the downsized RU or MRU used in the pre-FEC padding process, and a number of coded bits per OFDM symbol ($N_{CBPS}$) and a parameter $N_{CBPS,short}$ which is a number of coded bits per OFDM symbol for the downsized RU or MRU used in the pre-FEC padding process in performing pre-FEC padding in the encoding process based on the second size of the downsized RU or MRU instead of using RU allocation information in a user field of the trigger frame.

15. The apparatus of claim 11, wherein, in maintaining the value of each of one or more parameters unchanged, the processor is configured to maintain a number of symbols ($N_{sym}$) and a packet extension unchanged in the encoding process.

16. The apparatus of claim 11, wherein, in maintaining the value of each of one or more parameters unchanged, the processor is configured to maintain a modulation coding scheme (MCS), a number of spatial streams ($N_{SS}$), a pre-forward error correction (FEC) padding factor, a FEC coding type as signaled in a common field or a user-specific field of the trigger frame in the encoding process.

17. The apparatus of claim 11, wherein the downsized TB transmission comprises a downsized uplink (UL) orthogonal frequency-divisional multiple access (OFDMA) transmission.

18. The apparatus of claim 11, wherein the downsized TB transmission comprises a downsized uplink (UL) multi-user multiple-input-multiple-output (MU-MIMO) transmission.

19. The apparatus of claim 11, wherein, in performing the downsized TB transmission, the processor is configured to perform operations comprising:
maintaining a power spectral density (PSD) unchanged in performing the downsized TB transmission as indicated in the trigger frame; and adjusting a transmit power in performing the downsized TB transmission based on the second size of the downsized RU or MRU instead of using RU allocation information in a user field of the trigger frame.

20. The apparatus of claim 19, wherein, in adjusting the transmit power, the processor is configured to perform operations comprising:

calculating a value of a downsize ratio as a ratio of a total number of subcarriers in the downsized RU or MRU to a total number of subcarriers in the allocated RU in the trigger frame; and calculating the transmit power based on a downlink (DL) path loss ($PL_{DL}$), a target received signal strength indicator ($Target_{RSSI}$) and a log-based value of the downsize ratio.

* * * * *